United States Patent [19]

Magliozzi et al.

[11] Patent Number: 5,197,855
[45] Date of Patent: Mar. 30, 1993

[54] ENGINE EXHAUST/BLADE INTERACTION NOISE SUPPRESSION

[75] Inventors: Bernard Magliozzi, West Suffield; Donald B. Hanson, Broad Brook, both of Conn.

[73] Assignee: United Technologies Corporation, Hartford, Conn.

[21] Appl. No.: 727,258

[22] Filed: Jul. 1, 1991

[51] Int. Cl.[5] .............................................. F01B 25/02
[52] U.S. Cl. .................................... 415/167; 415/119; 415/183; 415/185
[58] Field of Search ............... 415/119, 148, 151, 159, 415/167, 183, 185, 208.1, 208.2; 60/268, 226.1, 270.1; 244/69

[56] References Cited

U.S. PATENT DOCUMENTS

| 3,613,827 | 10/1971 | Labussiere | 181/33 HC |
| 4,738,589 | 4/1988 | Wright | 416/127 |
| 4,864,820 | 9/1989 | Wynosky et al. | 60/270.1 |
| 4,883,240 | 11/1989 | Adamson et al. | 244/69 |

FOREIGN PATENT DOCUMENTS 601170 4/1948 United Kingdom .

OTHER PUBLICATIONS

Metzger, F. B.: "Aerodynamics and Acoustics of Propellers", paper presented at conference of NATO's Advisory Group for Aerospace Research & Development, Oct. 1–4, 1984.

Primary Examiner—Edward K. Look
Assistant Examiner—Todd Mattingly

[57] ABSTRACT

Noise is reduced on an aircraft engine of the type having aft mounted propeller blades 10 which pass through exhaust gas streams 20 expelled from circumferentially spaced nozzles 14. The nozzles 14 are rotated, or the exhaust flow deflected, such that the high velocity exhaust streams 20a expelled from the nozzles 14 are directed away from their normal axial direction to impact the blades 10 at the same relative angle of attack 36a as the relative angle of attack 34 of the low velocity ambient air stream 22 thereby reducing fluctuations in blade lift and the associated noise.

5 Claims, 2 Drawing Sheets

ENGINE EXHAUST/BLADE INTERACTION NOISE SUPPRESSION

TECHNICAL FIELD

This invention relates to noise reduction on aircraft engines, and more particularly to the reduction of noise generated by turbo props with aft mounted propellers.

BACKGROUND ART

It is known that means must be provided for directing the engine exhaust past the aft mounted propeller blades of a pusher prop engine. One typical method known as a "warm" configuration uses a plurality of circumferentially spaced exhaust nozzles placed upstream of the propeller that diffuse the exhaust and promote a mixing of the exhaust with ambient air. The "warm" configuration is disclosed in British Patent No. 601,170 and in commonly assigned U.S. Pat. No. 4,864,820. The circumferentially spaced exhaust nozzles are located on the aft engine body and are disposed to direct the high velocity exhaust gas axially back to extract the maximum work from the engine. A problem with this system however, is that the nozzles effectively split the exhaust into several high velocity gas streams thereby generating a distorted flow-field into the propeller. As the propeller rotates, each propeller blade alternately passes from the ambient air flow into and out of the higher velocity flow of the exhaust gas being expelled from each nozzle. This action in turn results in fluctuating loads on the blades. These fluctuating blade loads can result in the generation of significant, and at times undesirable, levels of noise. This interaction has been shown in tests to be a dominant noise source.

DISCLOSURE OF INVENTION

An object of this invention is to reduce the noise caused by the nozzle flow/blade interaction on an aircraft engine having an aft mounted propeller whose blades alternately pass through exhaust streams and air streams as the propeller rotates. Another object of the present invention is to suppress interaction noise during take-off and approach, while not adversely affecting the engine performance at cruise.

A major step in the invention is the recognition of the fact that much of the interaction noise generated by the exhaust flow and the propeller as the propeller blades alternately pass through exhaust streams and ambient streams is due to the fact that each flow stream, the exhaust and ambient, results in a different relative angle of attack, which leads to fluctuations in lift as the blade moves from one flow stream to the other flow stream. The fluctuations in lift, in turn, cause the blade to radiate noise. The different angles of attack result from the difference in velocity of the high velocity exhaust and low velocity ambient flow streams when considered with respect to the rotation of the propeller.

According to the invention, noise generated when the propeller blades pass alternately through exhaust streams and ambient air streams as the propeller rotates is substantially reduced by directing the normally axial flow of the jet exhaust as it emerges from the nozzles (thus correcting for its higher velocity) so that it impacts the blade at nearly the same angle of attack as the ambient air stream. The invention reduces or eliminates any differences in angles of attack so that the lift coefficient of the blade remains nearly constant as the blade passes sequentially through the high velocity exhaust and low velocity ambient flow streams, thus significantly reducing interaction noise.

Additionally, the nozzle flow may be selectively directed by means of a retractable deflector, a swiveling nozzle, an adjustable vane nozzle, or some other means for deflecting the exhaust flow stream during take-off and approach to effectuate the desired noise reduction and then either redirect the exhaust flow stream axially for better performance at cruising speeds and where noise is less critical, or further adjust the nozzle flow direction to best optimize the aerodynamic loading on the blades during the entire flight regime. This aerodynamic optimization may be effected by using an exhaust angle that slightly increases the lift coefficient of the blade as it passes through the higher velocity exhaust stream. The slightly increased lift will balance the additional pressure load that the blade experiences as it passes through the high velocity exhaust stream.

This invention has the incidental benefit of improving the low-speed aerodynamic performance of the aircraft engine. This in turn may enable the aircraft to realize greater carrying capacity.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
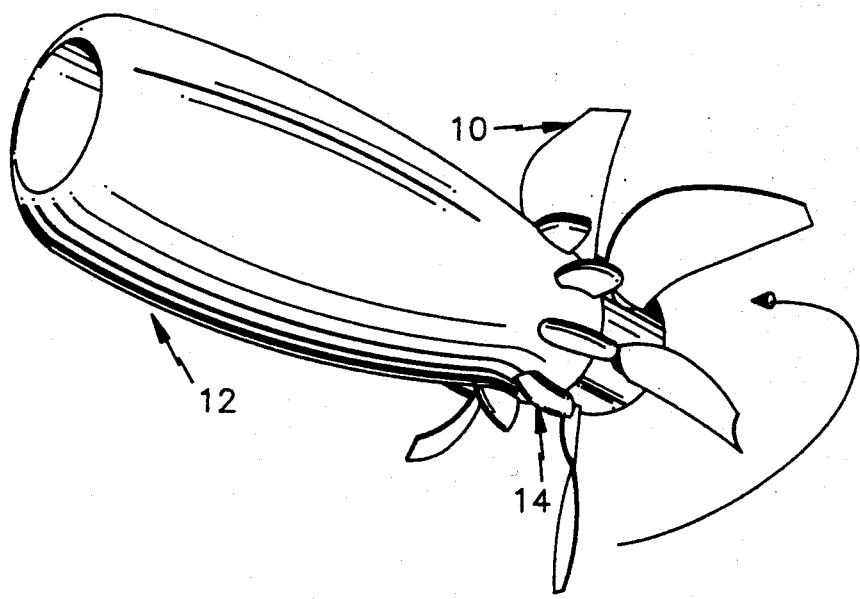
FIG. 1 is a perspective view of the nozzle and propeller arrangement on an aircraft engine having an aft-mounted propeller.
Figure 2:
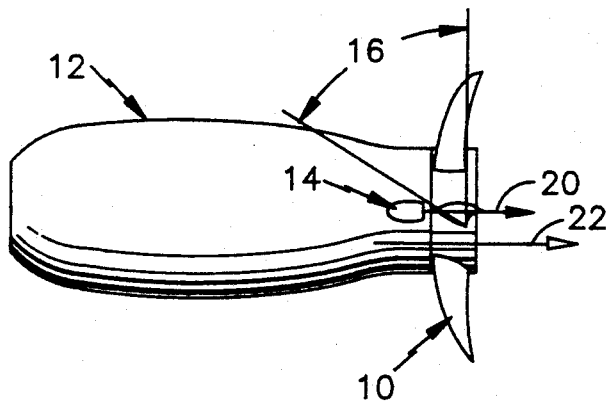
FIG. 2 is a diagrammatic side view of the aircraft engine of FIG. 1 showing one representative exhaust nozzle directed in the axial direction.

Referring to FIG. 1, a propeller having a plurality of blades 10 is mounted by conventional means to the aft end of the engine 12. A series of exhaust nozzles 14, spaced circumferentially around the aft end of the engine forward of the propeller blades 10, direct the exhaust flow in the axial direction towards the propeller blades 10. As the propeller rotates, the blades see a distorted flow field as they alternately pass through high velocity exhaust streams discharging from the circumferentially spaced nozzles and low velocity ambient air streams therebetween. In FIG. 2, the propeller blade 10 is depicted as it passes directly through the exhaust flow stream as the exhaust is expelled from nozzle 14. The exhaust flow stream is indicated by vector 20, and the ambient air flow stream is indicated by vector 22. The chord angle 16 of the blade 10 represents the pitch of the blade 10 and is measured from the plane of rotation of the blade 10, which is perpendicular to the axial flow stream.

Figure 3:
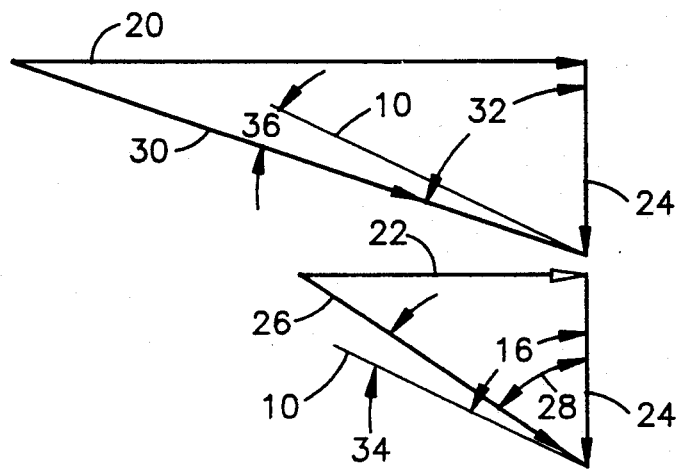
FIG. 3 is a vector diagram of the velocity relationships that result when the propeller blade passes sequentially through flow streams generated by ambient air and axially directed exhaust nozzles as depicted in FIG. 2.

Referring to FIG. 3, vector 20 represents the axial velocity component of the exhaust expelled from a nozzle 14. Vector 22 represents the axial velocity component of the ambient air as it impacts the blade 10 when the blade is between the nozzles 14. The rotational velocity of the blade 10 is represented by vector 24 and acts in a direction which is perpendicular to the axial flow. When the blade 10 is between exhaust nozzles 14, it passes through the ambient flow stream 22. The addition of the ambient flow vector 22 and the rotational vector 24 produces the resultant ambient flow vector 26 which is representative of the relative ambient stream that the blade actually sees as it passes between the exhaust nozzles 14. This resultant ambient flow stream vector 26 impacts the blade 10 at an angle 28 to the plane of rotation of the blade 10. However, when the blade 10 is directly behind the nozzle 14 and in the exhaust stream, the larger exhaust flow stream vector 20, when added to the rotational component 24, produces a resultant velocity vector 30 which impacts the blade 10 at an angle 32 to the plane of rotation of the blade 10.

During take-off and landing, the resultant flow angle 32 of each exhaust stream is significantly larger than the resultant flow angle 28 of each ambient air stream. This difference in resultant angles is due to the relatively large disparity between the velocity of the exhaust nozzle flow 20 which typically may be 1200 feet per second, and the velocity of the ambient air flow 22 which is nominally the forward speed of the aircraft and which initially is near 0 feet per second as the aircraft begins to move down the runway. The resulting difference in velocity of up to 1200 feet per second during take-off and landing is relatively high compared with the difference in typical flow velocities during cruise of 1000 feet per second and 750 feet per second generated by the nozzle exhaust and ambient air streams respectively, which result in a velocity difference of only 250 feet per second.

The relatively large velocity difference of the flow streams during take-off and landing results in a large difference in resultant flow angles 28 and 32, which in turn correspond to large differences in effective angles of attack on the blade 10 which lead to large fluctuations in blade lift as the coefficient of lift exhibited by the blade 10 varies in direct relationship to the effective angle of attack on the blade 10.

The resultant ambient flow stream angle 28 corresponds to a positive angle of attack 34, which is equal to the blade chord angle 16 minus the resultant angle 28, on the blade 10 as it passes through each air stream 22. The larger resultant exhaust flow stream angle 32 corresponds to a negative angle of attack 36, determined by subtracting the resultant exhaust flow angle 32 from the chord angle 16, on the blade 10 as it passes through each exhaust stream 20. Especially during take-off and landing, as blade 10 passes sequentially through ambient air streams and exhaust flow streams, both the effective angle of attack and the relative velocity of the flow stream change significantly. Therefore, due to the direct relationship between the effective angle of attack and blade coefficient of light, the significantly reduced angle of attack 36 results in the blade 10 exhibiting a reduced coefficient of lift, possibly reaching negative lift as illustrated in FIG. 3, as the blade 10 passes through the exhaust flow.

The reduced lift results because the resultant nozzle flow stream angle 32 approaches or becomes greater than the chord angle 16 of the blade 10 and the corresponding angle of attack 36 is reduced or becomes negative. The ambient angle of attack 34 corresponds to the magnitude of the positive lift generated by the blade 10. As the blade 10 moves into the flow from nozzle 14 and the resultant flow stream vector as experienced by the blade 10 moves from ambient 26 to exhaust 30, the resultant flow angle moves from 28 to 32 and the corresponding angle of attack moves from 34 to 36. As the angle of attack so moves, the value of the positive lift becomes increasingly smaller representing reduced lift. The lift exhibited by blade 10 actually becomes negative when the resultant nozzle flow stream angle 32 exceeds blade cord angle 16 generating a negative angle of attack 367 as shown in FIG. 3. This fluctuating lift generated as the blade 10 passes sequentially through ambient air streams and exhaust flow streams in turn produces a large fluctuating loading change on the blade which radiates noise.

Figure 4:
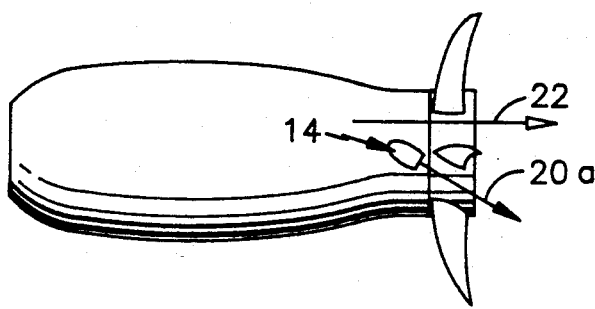
FIG. 4 is a diagrammatic side view of the aircraft engine of FIG. 1 showing one representative angled exhaust nozzle according to the invention.
Figure 5:
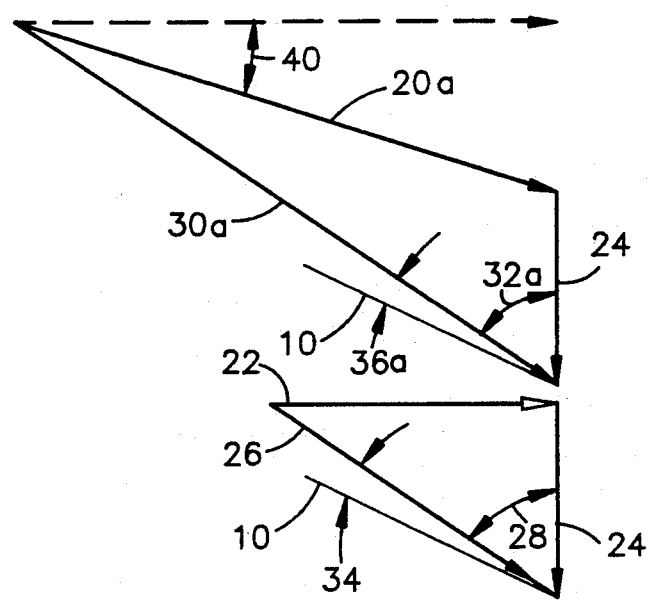
FIG. 5 is a vector diagram of the velocity relationships that result when the propeller blade passes sequentially through flow streams generated by ambient air and exhaust flow from an angled nozzle as depicted in FIG. 4.

According to the invention, this noise problem can be reduced by directing the exhaust steams 20 discharging from the nozzles 14 away from the axial direction toward the blade 10, for example by rotating the nozzles 14, such that the exhaust flow steam 20a impact the blade 10 at an angle of attack 36a that is nearly equivalent to he ambient flow steam angle of attack 34 as depicted in FIG. 4. In the vector diagram of FIG. 5, nozzle flow 20a is directed at an angle 40 from the axial direction such that when the exhaust vector is added to the rotational vector 24 of blade 10, the resultant flow steam 30a has an effective angle of attack 36a on the blade 10 that is essentially equivalent to the effective angle of attack 34 of the resultant ambient flow 26. Therefore, there is no angle of attack fluctuation as blade 10 moves through the exhaust flow stream from nozzle 14. Since there is no angle of attack fluctuation, the fluctuating loading changes caused by variations in lift are subsequently reduced, greatly reducing the noise generated. Additionally, the actual nozzle adjustment angle 40 can be changed slightly so that a small change in angle of attack 36a can be generated to cancel the change in dynamic pressure that blade 10 experiences as it passes from the lower velocity ambient flow steam 26 into the higher velocity exhaust flow steam 30. Therefore, the angle of attack of the exhaust flow steam 36 may be adjusted to provide the best cancellation of angle of attack differences and dynamic pressure effects for the specific nozzle configuration, velocity, temperature, tip speed, flight speed, etc.

A principal aspect of the invention direct the normally axial flow steam of the jet exhaust so that the exhaust stream angle of attack closely approximates the ambient air stream angle of attack to the propeller blades to reduce fluctuations in blade lift coefficients during take-off and landing.

It is also desirable to either redirect the exhaust flow stream axially for better performance at cruising speeds where noise is less critical, or further adjust the nozzle flow direction to best optimize the aerodynamic loading on the blades during the entire flight regime. Although it is desirable to use a means for rotating each exhaust nozzle to accomplish this result, the invention is not limited to such configuration. Means for directing the exhaust stream may comprise, rather than a rotatable nozzle, moveable vanes, stationary vanes, retractable deflectors, or any other means operatively associated with a stationary nozzle, which, when activated, function to selectively deflect each of said exhaust streams as they emerge from the nozzles towards said propeller blades at an angle away from the axial direction. Additionally, the invention is equally applicable to turboprop engines having more than one axially spaced aft mounted rotor such as a conventional counter rotating propeller, since the forward rotor, even in multi-rotor arrangements, is responsible for generating most of the propeller/exhaust interaction noise.

Although the invention has been shown and described with respect to a specific embodiment thereof, it should be understood by those skilled in the art that the foregoing and various other changes, omissions, and additions in the form and detail thereof may be made therein without departing from the spirit and scope of the invention.

We claim:

1. A method for reducing noise generated on an aircraft propulsion system of the type having a gas turbine engine, a plurality of exhaust nozzles disposed at circumferentially spaced intervals about an aft portion of the engine, each said nozzle discharging a stream of exhaust in a generally axial direction, and a propeller mounted to said engine aft of said exhaust nozzles, said propeller having a plurality of blades, each blade alternately passing as said propeller rotates into and out of the circumferentially spaced exhaust streams discharging from said nozzles, characterized by:
    selectively directing each of the exhaust streams away from the axial direction toward said rotating blades whereby each blade is impacted by said exhaust streams at an effective angle of attack which remains relatively constant as said blades pass through and between the circumferentially spaced exhaust streams.

2. The method according to claim 1 as further characterized by:
    selectively directing each of the exhaust streams away from the axial direction toward said rotating blades during a take-off and an approach portion of a flight; and
    redirecting each of the exhaust streams axially during a cruise portion of the flight.

3. A low noise turbo prop propulsion system of the type having a gas turbine engine, a plurality of exhaust nozzles disposed at circumferentially spaced intervals about an aft portion of the engine, each said nozzle discharging a stream of exhaust in a generally axial direction, and a propeller mounted to said engine aft of said exhaust nozzles, said propeller having a plurality of blades, each blade alternately passing as said propeller rotates into and out of the circumferentially spaced exhaust streams discharging from said nozzles, as characterized by:
    means for directing each of said exhaust streams towards said propeller blades at an angle away from the axial direction.

4. The low noise turbo prop propulsion system of claim 3 wherein said system is further characterized in that:
    said nozzles comprise selectably rotatable nozzles for directing each of said exhaust streams towards said propeller blades at an angle away from the axial direction.

5. The low noise turbo prop propulsion system of claim 3 wherein said system is further characterized by:
    selectively actuatible means for deflecting each of said exhaust streams towards said propeller blades as the streams emerge from each of said nozzles at an angle away from the axial direction, said deflection means operatively associated with said nozzles.

* * * * *